US011716418B2

(12) United States Patent
Nesargi et al.

(10) Patent No.: US 11,716,418 B2
(45) Date of Patent: Aug. 1, 2023

(54) SYSTEMS AND METHODS FOR FACILITATING COMMUNICATION BETWEEN A USER AND A SERVICE PROVIDER

(71) Applicant: Fidelity Information Services, LLC, Jacksonville, FL (US)

(72) Inventors: Susheel Nesargi, Saint Johns, FL (US); David Berglund, Ponte Vedra, FL (US); Glen M. Casey, Quinton, AL (US)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

(21) Appl. No.: 17/567,770

(22) Filed: Jan. 3, 2022

(65) Prior Publication Data
US 2023/0216956 A1 Jul. 6, 2023

(51) Int. Cl.
*H04M 3/00* (2006.01)
*H04M 3/51* (2006.01)

(52) U.S. Cl.
CPC ....... *H04M 3/5141* (2013.01); *H04M 3/5166* (2013.01); *H04M 2203/255* (2013.01)

(58) Field of Classification Search
CPC .............. H04M 3/5141; H04M 3/5166; H04M 2203/255
USPC ....... 379/265.01–265.14, 266.01–266.1, 309
See application file for complete search history.

(56) References Cited

U.S. PATENT DOCUMENTS

| 2005/0152529 A1* | 7/2005 | Kumar | H04M 3/5183 |
| | | | 379/265.02 |
| 2009/0210228 A1 | 8/2009 | George | |
| 2016/0080428 A1* | 3/2016 | Fan | H04L 65/1069 |
| | | | 709/228 |

OTHER PUBLICATIONS

Invitation to Pay Additional Fees and, Where Applicable, Protest Fee issued in International Application No. PCT/US2022/082633 dated Apr. 20, 2023 (8 pages).

* cited by examiner

*Primary Examiner* — William J Deane, Jr.
(74) *Attorney, Agent, or Firm* — Bookoff McAndrews, PLLC

(57) ABSTRACT

Systems and methods are disclosed for generating a dynamic customized script to facilitate communication between a user and a service provider. The method includes receiving, via an interactive voice response (IVR) system, a request from a mobile device associated with at least one user. The contextual information associated with at least one user is processed, in real-time, based, at least in part, on the request. A dynamic customized script specific to the request is generated, in real-time, based, at least in part, on the processing of the contextual information. The request is routed, via the IVR system, to an agent from a pool of agents of the service provider. A presentation of the dynamic customized script is generated in a user interface of a device associated with the agent, wherein the dynamic customized script is step-by-step guidance to the agent for handling the request of at least one user.

20 Claims, 17 Drawing Sheets

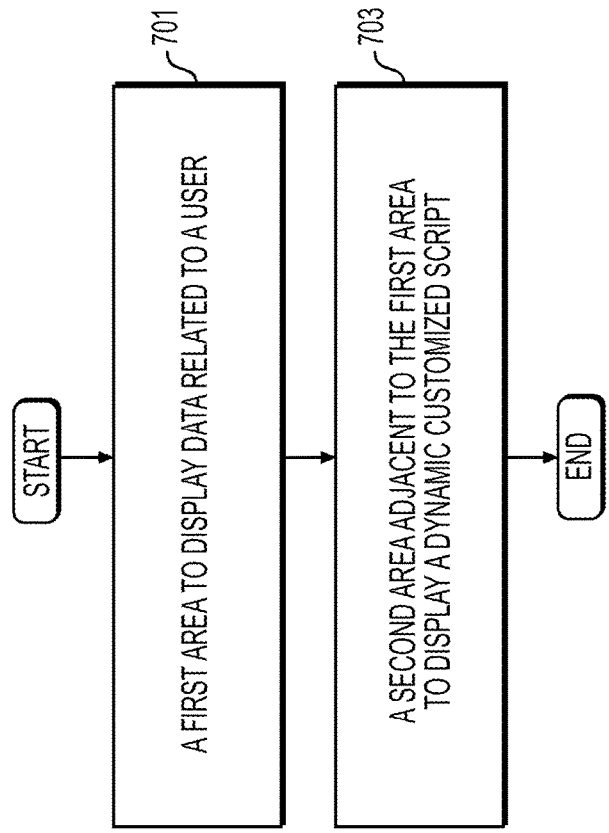

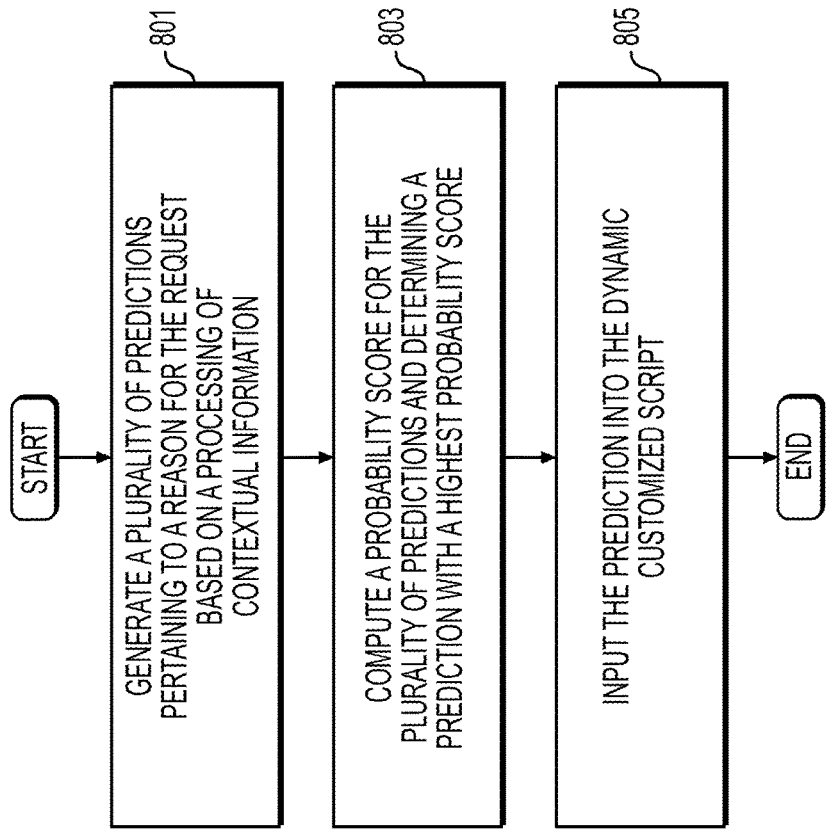

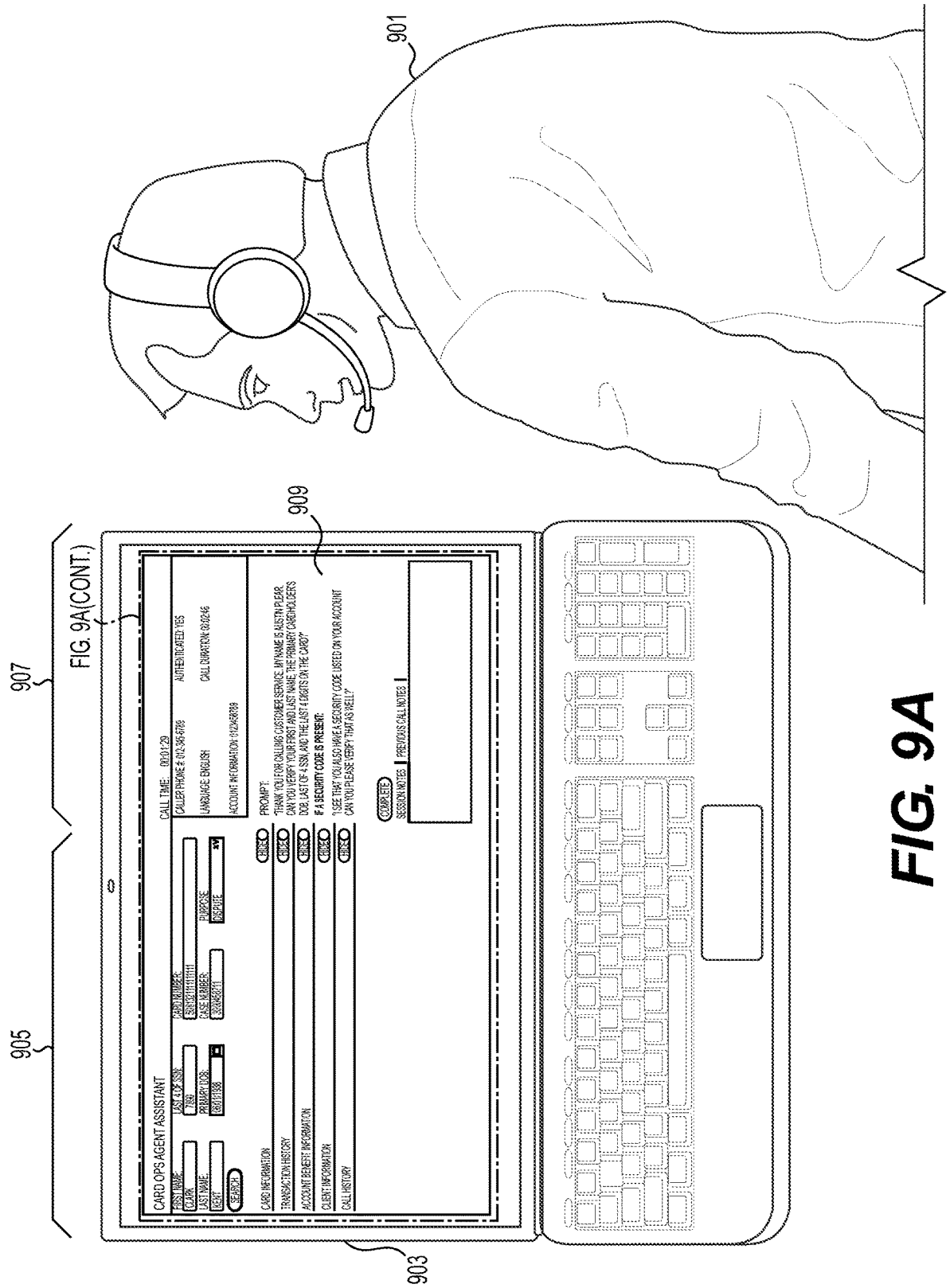

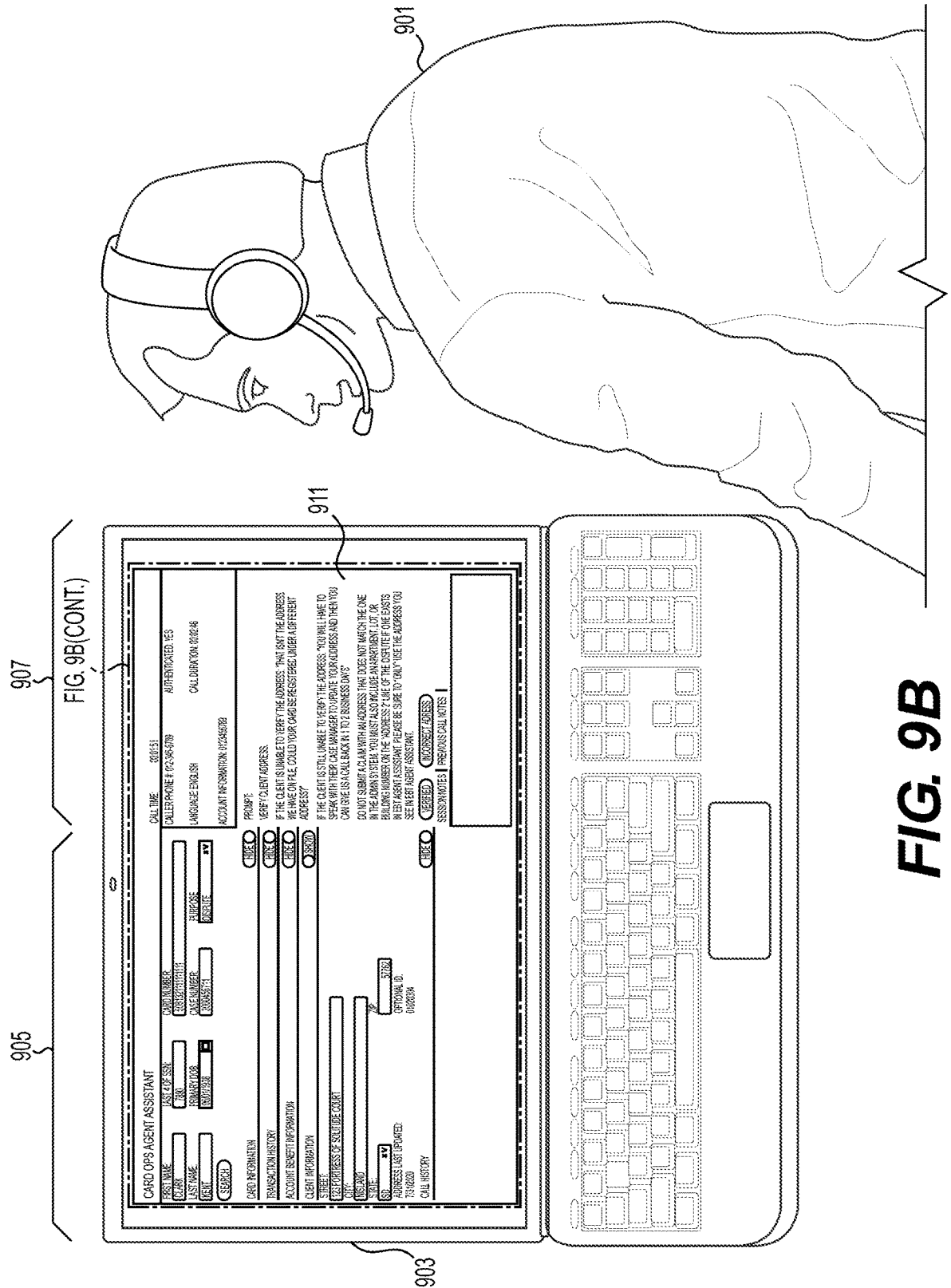

CARD OPS AGENT ASSISTANT

| FIRST NAME: | CARD NUMBER: | CALL TIME: 00:01:51 | |
|---|---|---|---|
| CLARK | 50813211111111 | CALLER PHONE #: 012-345-6789 | AUTHENTICATED: YES |
| LAST NAME: | CASE NUMBER: | LANGUAGE: ENGLISH | CALL DURATION: 00:02:46 |
| KENT | 3000456711 | | |
| PRIMARY DOB: | PURPOSE | ACCOUNT INFORMATION: 0123456789 | |
| 06/01/1938 ☐ | DISPUTE ˅ | | |
| (SEARCH) | | | |

CARD INFORMATION (HIDE ◯)

TRANSACTION HISTORY (HIDE ◯)

ACCOUNT BENEFIT INFORMATION (HIDE ◯)

CLIENT INFORMATION (◯ SHOW)

STREET:
123 FORTRESS OF SOLITUDE COURT

CITY:
NISLAND

STATE:        ZIP:
SD  ˅        57762

ADDRESS LAST UPDATED:   OPTIONAL ID:
7/31/2020               01020304

CALL HISTORY (HIDE ◯)

PROMPT:
VERIFY CLIENT ADDRESS.

IF THE CLIENT IS UNABLE TO VERIFY THE ADDRESS: "THAT ISN'T THE ADDRESS WE HAVE ON FILE, COULD YOUR CARD BE REGISTERED UNDER A DIFFERENT ADDRESS?"

IF THE CLIENT IS STILL UNABLE TO VERIFY THE ADDRESS: "YOU WILL HAVE TO SPEAK WITH THEIR CASE MANAGER TO UPDATE YOUR ADDRESS AND THEN YOU CAN GIVE US A CALL BACK IN 1 TO 2 BUSINESS DAYS"

DO NOT SUBMIT A CLAIM WITH AN ADDRESS THAT DOES NOT MATCH THE ONE IN THE ADMIN SYSTEM. YOU MUST ALSO INCLUDE AN APARTMENT, LOT, OR BUILDING NUMBER ON THE "ADDRESS 2" LINE OF THE DISPUTE IF ONE EXISTS IN EBT AGENT ASSISTANT. PLEASE BE SURE TO "ONLY" USE THE ADDRESS YOU SEE IN EBT AGENT ASSISTANT.

(VERIFIED)  (INCORRECT ADDRESS)

SESSION NOTES  |  PREVIOUS CALL NOTES  |

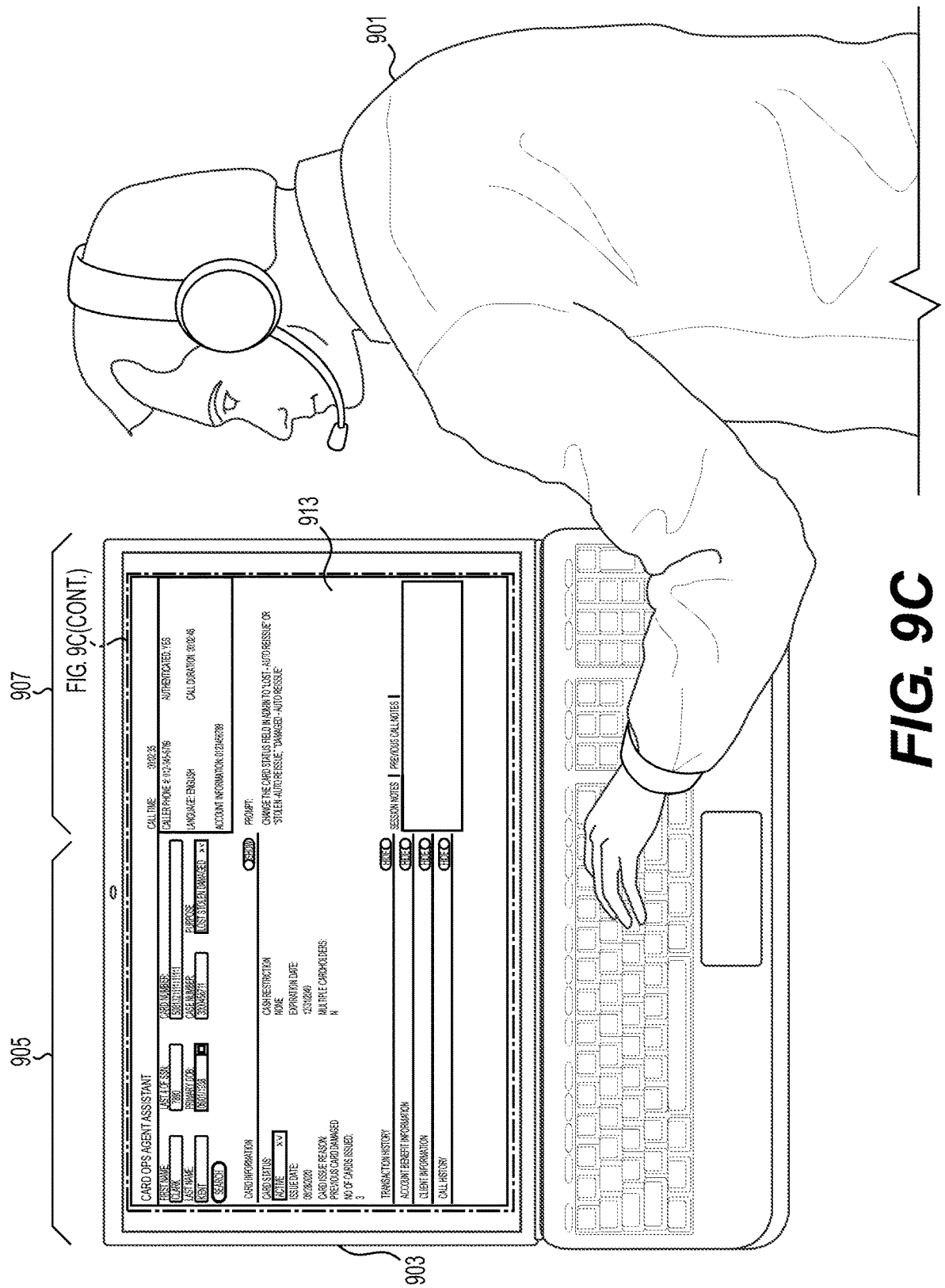

CARD OPS AGENT ASSISTANT

| FIRST NAME: | LAST 4 OF SSN: | CARD NUMBER: | | CALL TIME: | 00:02:35 | |
|---|---|---|---|---|---|---|
| CLARK | 7890 | 5081321111111111 | | CALLER PHONE #: 012-345-6789 | | AUTHENTICATED: YES |
| LAST NAME: | PRIMARY DOB: | CASE NUMBER: | PURPOSE | LANGUAGE: ENGLISH | | CALL DURATION: 00:02:46 |
| KENT | 06/01/1938 ☐ | 3000456711 | LOST STOLEN DAMAGED xv | | | |
| (SEARCH) | | | | ACCOUNT INFORMATION: 0123456789 | | |

CARD INFORMATION                                    ○SHOW    PROMPT:

CARD STATUS:                                                 CHANGE THE CARD STATUS FIELD IN ADMIN TO "LOST - AUTO REISSUE" OR
ACTIVE   xv                                                  "STOLEN - AUTO REISSUE," "DAMAGED - AUTO REISSUE"

CASH RESTRICTION
NONE

ISSUE DATE:
08/28/2020

EXPIRATION DATE:
12/31/2049

CARD ISSUE REASON:
PREVIOUS CARD DAMAGED

MULTIPLE CARDHOLDERS:
N

NO OF CARDS ISSUED:
3

TRANSACTION HISTORY                                 (HIDE○)

ACCOUNT BENEFIT INFORMATION                         (HIDE○)    SESSION NOTES | PREVIOUS CALL NOTES

CLIENT INFORMATION                                  (HIDE○)

CALL HISTORY                                        (HIDE○)

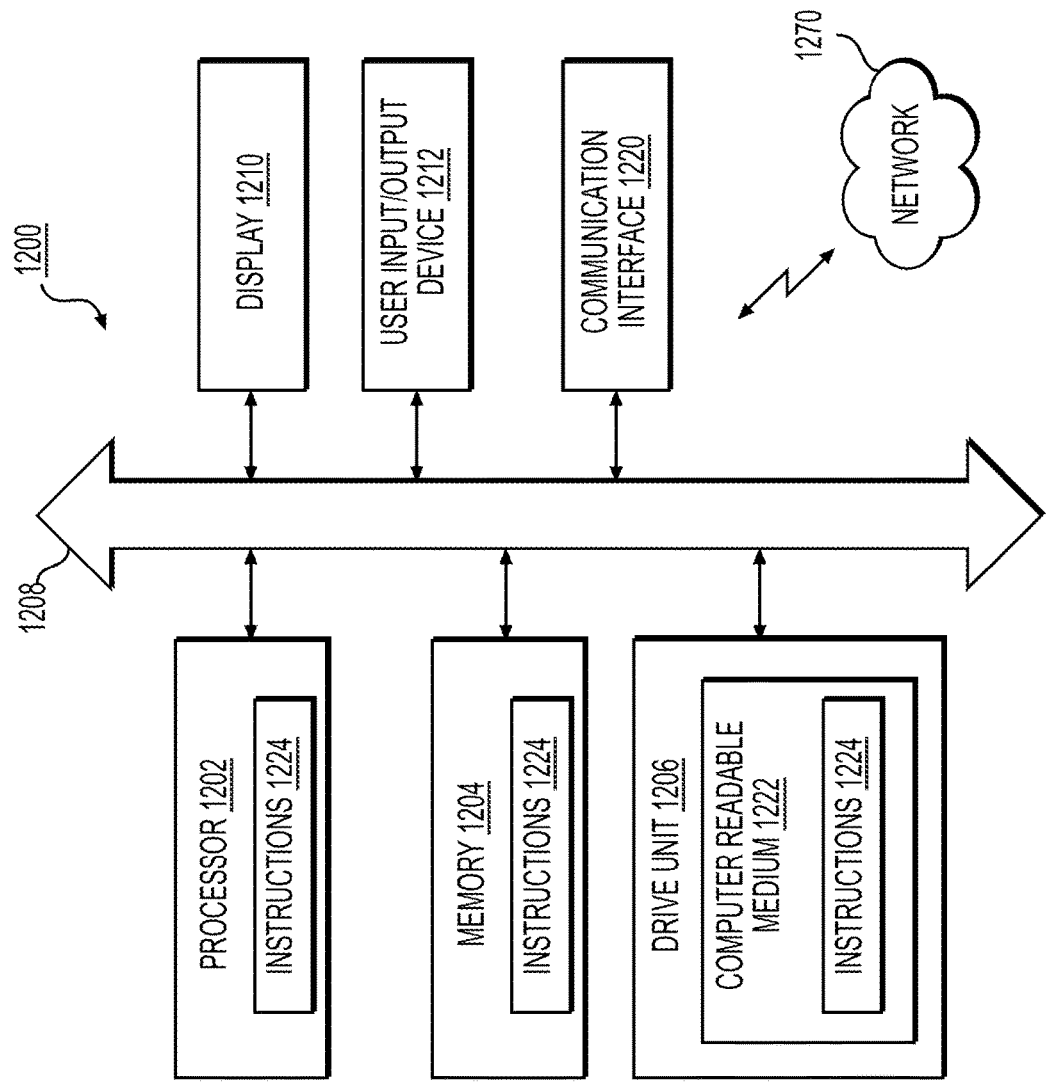

SYSTEMS AND METHODS FOR FACILITATING COMMUNICATION BETWEEN A USER AND A SERVICE PROVIDER

TECHNICAL FIELD

The present disclosure relates generally to the field of computer telephony integration (CTI) technology and Interactive Voice Response (IVR) technology. More particularly, the present disclosure relates to the processing of a communication session in a CTI system and/or an IVR system to facilitate communication between a caller and a service provider.

BACKGROUND

Organizations route callers using an IVR system that provides computer-generated voice messages to guide the caller, e.g., a caller may hear an audio message requesting credit card information, whereupon the caller may provide the credit card information by voice input or by entering the information via the keypad of the mobile device. The IVR system may ask a series of additional questions to connect the caller to a suitable agent. Typically, this process is time-consuming because the caller has to listen and follow instructions to get the desired response or a function performed. This process is also laborious and error-prone, e.g., if the caller provides an incorrect input, the process may have to be repeated.

Furthermore, while transitioning the call to an agent the context of the call may be lost, and the caller may need to provide personal information. It is frustrating for the caller to repeat the information they had previously provided. Moreover, when the context of the call is lost, the system is unable to provide required documentation to the agents to address the queries of the callers. Hence the agents may rely on their experience to handle the situation with minimal support from the system. This defeats the intent of the IVR system in easing customer service for callers.

Accordingly, there is a need for systems and methods for streamlined integration of the IVR systems to facilitate interaction between a caller and the service provider. Improving the efficiency and effectiveness of agent-caller interactions may result in greater customer satisfaction, reduced operational costs, and efficient business processes.

SUMMARY OF THE DISCLOSURE

According to certain aspects of the disclosure, systems and methods are disclosed for providing configuration parameters in a streamlined manner so that developers can construct end-to-end solutions in an automated manner.

In one embodiment, a method is disclosed for facilitating interaction between at least one user and a service provider. The method includes: receiving, via an interactive voice response (IVR) system, a request from a mobile device associated with the at least one user; processing, in real-time, contextual information associated with the at least one user based, at least in part, on the request; generating, in real-time, a dynamic customized script specific to the request based, at least in part, on the processing of the contextual information; routing, via the IVR system, the request to an agent from a pool of agents of the service provider; and generating a presentation of the dynamic customized script in a user interface of a device associated with the agent, wherein the dynamic customized script is a step-by-step guidance to the agent for handling the request of the at least one user.

In one embodiment, an apparatus comprises at least one processor, and at least one memory including computer program code for one or more computer programs, the at least one memory and the computer program code configured to, with the at least one processor, cause, at least in part, the apparatus to facilitate interaction between at least one user and a service provider. The apparatus causes: receive, via an interactive voice response (IVR) system, a request from a mobile device associated with the at least one user; process, in real-time, contextual information associated with the at least one user based, at least in part, on the request; generate, in real-time, a dynamic customized script specific to the request based, at least in part, on the processing of the contextual information; route, via the IVR system, the request to an agent from a pool of agents of the service provider; and generate a presentation of the dynamic customized script in a user interface of a device associated with the agent, wherein the dynamic customized script is a step-by-step guidance to the agent for handling the request of the at least one user.

In accordance with another embodiment, a non-transitory computer-readable storage medium having stored thereon one or more program instructions which, when executed by one or more processors, cause, at least in part, an apparatus to facilitate interaction between at least one user and a service provider. The apparatus causes: receiving, by via interactive voice response (IVR) system, a request from a mobile device associated with the at least one user; processing, in real-time, contextual information associated with the at least one user based, at least in part, on the request; generating, in real-time, a dynamic customized script specific to the request based, at least in part, on the processing of the contextual information; routing, via the IVR system, the request to an agent from a pool of agents of the service provider; and generating a presentation of the dynamic customized script in a user interface of a device associated with the agent, wherein the dynamic customized script is a step-by-step guidance to the agent for handling the request of the at least one user.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 is a flowchart of a process for presenting a dynamic customized script, according to one embodiment;

FIG. 8 is a flowchart of a process for predicting the intent of a call, according to one embodiment;

FIGS. 9A-C illustrate agent interface screens, according to various example embodiments;

FIG. 12 illustrates an implementation of a general computer system that may execute techniques presented herein.

DETAILED DESCRIPTION OF EMBODIMENTS

Figure 1:
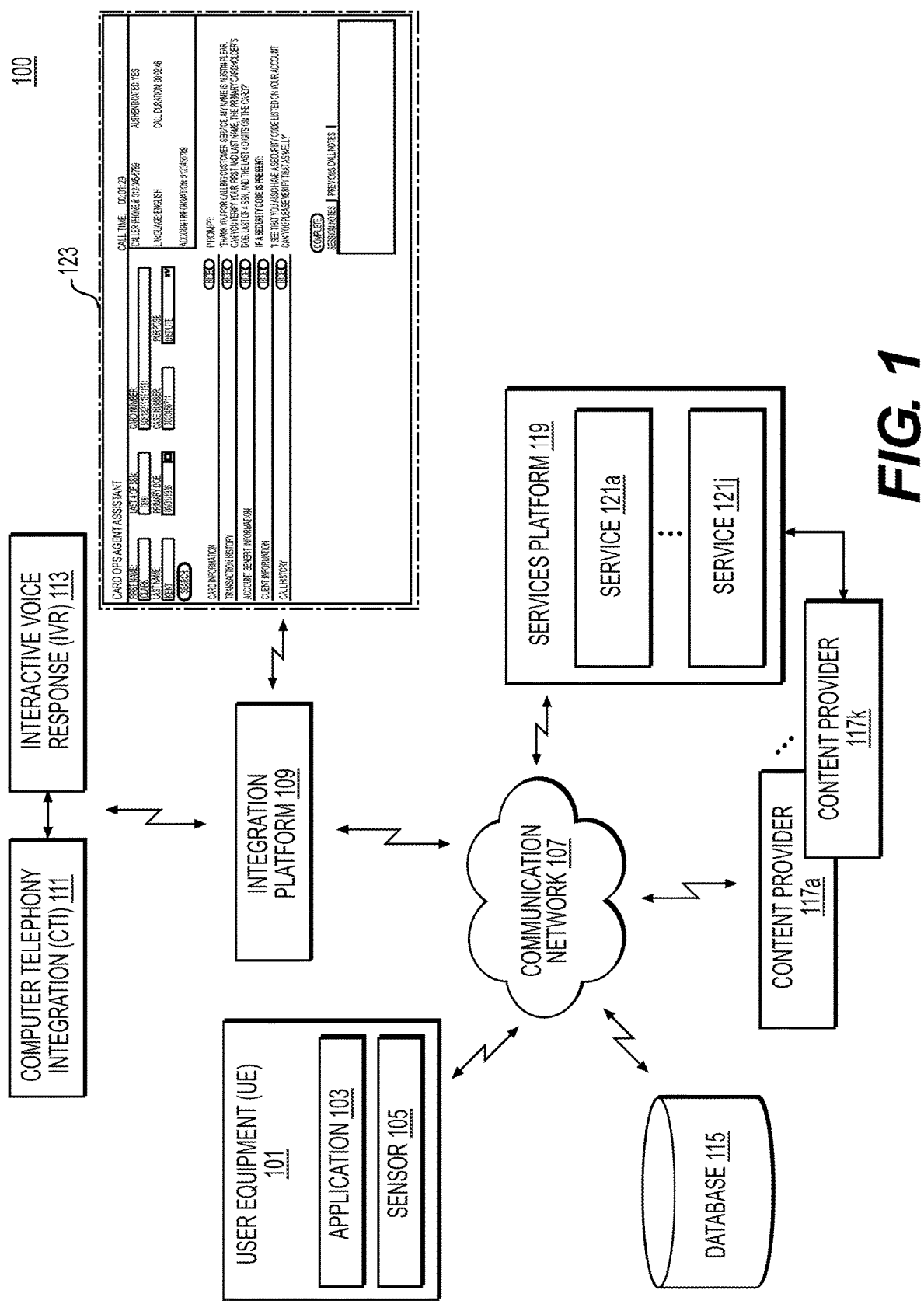
FIG. 1 is a diagram of a system capable of generating a dynamic customized script to facilitate communication between a user and a service provider, according to one example embodiment.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Calls are typically routed to contact center agents from the interactive voice response (IVR) and computer telephony integration (CTI) systems. These IVR and/or CTI systems may capture additional context pertaining to a call, however, in most cases, the context is lost. As a result, the contact center agent may be required to authenticate the caller all over again, resulting in caller frustration. Furthermore, there may not be a centralized knowledge base with detailed steps and instructions, and agents may be required to switch between multiple applications while processing the calls, leading to performance inefficiency.

Needless to mention, call flows are independent of the underlying systems, and there is limited context regarding the calls when agents first get connected with the caller. The system is also unable to provide required documentation to the agents because of this limited context requiring manual effort or reliance on agent expertise to address the queries of the callers. Furthermore, significant turnover within call center operations requires new/novice call center agents to learn quickly, but the challenges outlined herein and the steep learning curve around the processing of actions and transactions during the call have a direct bearing on the ability of new agents to be effective quickly.

As shown, the process is inefficient. Firstly, call duration may be excessively high, e.g., at the frontend the callers are repeatedly submitting data and at the backend the agents are working with multiple systems. This significantly impacts service providers especially the ones that outsource call center operations. Secondly, the waiting period for the callers may be extended, resulting in lower customer satisfaction. Thirdly, there may be an increase in agent errors as they are working with multiple systems.

The existing solutions require a lot of manual effort, whether in creating context regarding a call, accessing the knowledgebase for call flows, or simply needing to work with multiple applications, e.g., some desktop-based, some web-based, in order to process a call. As a result, service providers are continually challenged to optimize the operation of their contact centers to manage cost, reduce call durations, and enhance customer experience. Furthermore, data spans multiple sources and sub-types, but must be presented in a single user experience (UX) to prevent agents from switching between multiple applications during a call. Hence, service providers are technically challenged to streamline the integration with the IVR systems, and generate the call-context data in a simple user interface of the agent.

FIG. 1 is a diagram of a system capable of generating a dynamic customized script to facilitate communication between a user and a service provider, according to one example embodiment. FIG. 1 introduces a capability to implement modern communication and data processing capabilities into existing methods and systems for generating a dynamic customized script to facilitate communication between a user and a service provider. FIG. 1, an example architecture of one or more example embodiments of the present invention, includes system 100 that comprises user equipment (UE) 101*a*-101*n* (collectively referred to as UE 101) that may include or be associated with applications 103*a*-103*n* (collectively referred to as applications 103) and sensors 105*a*-105*n* (collectively referred to as sensors 105). In one embodiment, integration platform 109 has connectivity to computer telephony integration (CTI) 111 and interactive voice response (IVR) system 113, and via a communication network 107, e.g., a wireless communication network.

In one embodiment, system 100, enables service providers to have a streamlined solution for contact centers, which enhances the experience for the contact center agent, reduces the duration of the call, and leads to a better experience for the caller. In another embodiment, system 100 enables businesses to optimize their contact center operations by reducing call duration and hence their overall cost footprint. This has a direct bearing on overall operational costs, requiring less hands-on-deck to process calls, improved margins/productivity, and enhanced customer experience.

As shown in FIG. 1, system 100 comprises UE 101. In one embodiment, UE 101 may include, but is not restricted to, any type of a mobile terminal, wireless terminal, fixed terminal, a landline, or portable terminal. Examples of UE 101, may include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In addition, UE 101 may facilitate various input means for receiving and generating information, including, but not restricted to, a touch screen capability, a keyboard, and keypad data entry, a voice-based input mechanism, and the like. Any known and future implementations of UE 101 may also be applicable.

UE 101 includes applications 103. Further, applications 103 may include various applications such as, but not restricted to, content provisioning application, networking application, camera/imaging application, multimedia application, location-based application, media player applications, social networking applications, and the like. In one embodiment, one of the applications 103 at UE 101 may act as a client for integration platform 109 and perform one or more functions associated with the functions of integration platform 109 by interacting with integration platform 109 over the communication network 107.

By way of example, sensor 105 may be any type of sensor. In one embodiment, the sensors 105 may include, for example, a network detection sensor for detecting wireless signals or receivers for different short-range communications (e.g., Bluetooth, Wi-Fi, Li-Fi, near field communication (NFC), etc.), temporal information sensors, a global positioning sensor for gathering location data, a camera/imaging sensor for gathering image data, an audio recorder for gathering audio data, and the like. Any known and future implementations of sensor 105 may also be applicable.

Further, various elements of the system 100 may communicate with each other through a communication network 107. The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including 5G ($5^{th}$ Generation), 4G, 3G, 2G, Long Term Evolution (LTE), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, integration platform 109 may be a platform with multiple interconnected components. Integration platform 109 may include one or more servers, intelligent networking devices, computing devices, components, and corresponding software for generating a dynamic customized script to facilitate communication between a user and a service provider. In addition, it is noted that integration platform 109 may be a separate entity of the system 100, a part of the one or more services 121a-121j (collectively referred to as services 121) of the services platform 119, or the UE 101. Any known or still developing methods, techniques, or processes for generating a dynamic customized script to facilitate communication between a user and a service provider may be employed by integration platform 109.

In one embodiment, integration platform 109 may streamline call handling for contact center agents within a single application. In one example embodiment, integration platform 109 may integrate with the IVR and CTI systems to determine call context, e.g., caller details (such as card information) and call purpose (such as charge dispute), before the agent speaks with the caller. In another embodiment, integration platform 109 may validate a user based, at least in part, on user credentials, device identifiers, biometrics data, credit card information, or a combination thereof. Integration platform 109 may process, in real-time, contextual information, historical information, or a combination thereof associated with the user to gather required information for the call and may generate a dynamic script that defines a step-by-step process for handling the call. Integration platform 109 may update the script in real-time based, at least in part, on the varying context of the call, changes in service level agreement (SLA) that may have a bearing on the handling of calls, or a combination thereof. In a further embodiment, integration platform 109 may generate a unified display 123 to present user information and the dynamic script. Since the user information and the dynamic script are presented in a single interface of UE 101 by abstracting the behavior of the underlying systems, the agents do not have to switch between a plurality of applications while interacting with a caller.

It is noted that the disclosed subject matter relates to telephone calls to an IVR of a service provider, yet the disclosed subject matter, possibly with variations, may be applied to other media such as webpages, emails, SMS, and so forth. In one example embodiment, users may access the website of the service provider and may authenticate themselves via the website by entering credential information and/or device identifiers. Integration platform 109 may process, in real-time, contextual information of the users and may determine the users' need to be connected with an agent. Integration platform 109 may notify the user to call the contact center, whereupon integration platform 109 may integrate with the IVR and CTI systems to route the call to an appropriate agent. In one embodiment, integration platform 109 and IVR system 113 may use speech recognition algorithms to recognize the speech of the caller and then perform actions corresponding to the speech of the caller. In one embodiment, integration platform 109 may implement an initialization algorithm that provides the initial data that can be used by an intelligent IVR system to provide automatic IVR authentication and intention verification.

Computer telephony integration (CTI) system 111 may allow computers and telephones to interact and exchange information. In one embodiment, CTI system 111 may provide programmatic methods for executing CTI methods, e.g., call control operations such as answering a call, making a call, and transferring a call. In another embodiment, CTI system 111 may authenticate callers by screening the telephone number of the caller against a database to match it to a customer record and populate that data instantaneously in a user interface of a device associated with a call center agent. In one embodiment, CTI system 111 or at least its functionality may be incorporated into IVR system 113.

In one embodiment, IVR system 113 may be coupled to CTI system 111 for routing incoming calls from the callers over to at least one IVR system 113 or to at least one of the plurality of agent terminals. IVR system 113 may be an automated call processing system that provides self-service interactions to callers. In one embodiment, IVR system 113 may provide pre-recorded audible responses triggered for playback in response to user input. In another embodiment, IVR system 113 may include voice recognition technology that processes natural language input from callers to properly service the request of the callers, e.g., routing the call to an agent when requested by the caller or when detected as necessary. In one example embodiment, when a caller dials into IVR system 113, IVR system 113 may determine identification and intention. Identification is focused on authenticating the user's identity, e.g., IVR system 113 may prompt the caller to enter information that validates or authenticates the caller to use the IVR system. After the user is authenticated, the caller may select from a series of options to indicate their intention, i.e., the purpose of the call. IVR system 113 may then instruct CTI system 111 to transfer the call from IVR system 113 to at least one of the plurality of agent terminals.

In one embodiment, database 115 may be any type of database, such as relational, hierarchical, object-oriented, and/or the like, wherein data are organized in any suitable manner, including as data tables or lookup tables. In one embodiment, database 115 may store and manage multiple types of information that can provide means for aiding in the content provisioning and sharing process. In an embodiment, database 115 may include a machine-learning based training database with pre-defined mapping defining a relationship between various input parameters and output parameters based on various statistical methods. In an embodiment, the training database may include machine-learning algorithms to learn mappings between input parameters related to the user such as but not limited to user's online activity, historical user information, etc. In an embodiment, the training database is routinely updated and/or supplemented based on machine learning methods.

The content providers 117a-117k (collectively referred to as content provider 117) may provide content to UE 101, integration platform 109, and services 121 of the services platform 119. The content provided may be any type of content, such as, image content, textual content, audio content, video content, etc. In one embodiment, the content provider 117 may provide content that may supplement the content of the applications 103, the sensors 105, or a combination thereof. In one embodiment, the content provider 117 may provide or supplement the notification services/application, social networking services/application, content (e.g., audio, video, images, etc.) provisioning services/application, application services/application, storage services/application, contextual information determination services/application, location-based services/application, or any combination thereof. In one embodiment, the content provider 117 may also store content associated with UE 101, integration platform 109, and services 121 of services platform 119. In another embodiment, the content provider 117 may manage access to a central repository of data, and offer a consistent, standard interface to data.

The services platform 119 may include any type of service. By way of example, services platform 119 may include content (e.g., audio, video, images, etc.) provisioning services/application, notification services/application, contextual information determination services/application, notification services/application, storage services/application, social networking services/application, information-based services, etc. In one embodiment, services platform 119 may interact with UE 101, integration platform 109, and content provider 117 to supplement or aid in the processing of the content information. In one embodiment, the services platform 119 may be implemented or embedded in integration platform 109 or in its functions.

By way of example, services 121 may be an online service that reflects the interests and/or activities of users. Services 121 allow users to share contact information, location information, activities information, contextual information, historical user information, and interests within their individual networks, and provides for data portability. Services 121 may additionally assist in providing integration platform 109, CTI system 111, and IVR system 113 with activity information of at least one user, user profile information, and a variety of additional information.

By way of example, UE 101, integration platform 109 communicate with each other and other components of the communication network 107 using well-known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
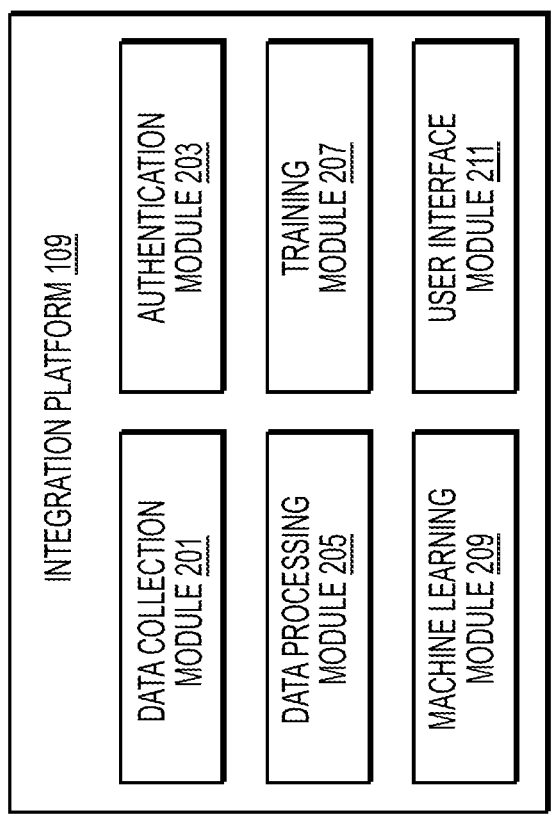
FIG. 2 is a diagram of the components of integration platform 109, according to one example embodiment.

FIG. 2 is a diagram of the components of integration platform 109, according to one example embodiment. By way of example, integration platform 109 includes one or more components for generating a dynamic customized script to facilitate communication between a user and a service provider. It is contemplated that the functions of these components may be combined in one or more components or performed by other components of equivalent functionality. In one embodiment, integration platform 109 comprises data collection module 201, authentication module 203, data processing module 205, training module 207, machine learning module 209, and user interface module 211, or any combination thereof.

In one embodiment, data collection module 201 may automatically collect relevant data associated with users, e.g., registered callers or non-registered callers, through various data collection techniques. For example, data collection module 201 may use a web-crawling component to access various databases or other information sources to determine the online activities information of the users. Data collection module 201 may be programmed to collect, in real-time, historical information, contextual information, or a combination thereof pertaining to the users, so that identification, analysis, response, monitoring, and control may be performed using the most recent data. In one example embodiment, data collection module 201 may include various software applications, e.g., data mining applications in Extended Meta Language (XML), that automatically search for and return relevant information pertaining to the users. In one embodiment, data collection module 201 may parse and arrange the data into a common format that can be easily processed by other modules and platforms.

In one embodiment, authentication module 203 may authenticate the users, e.g., registered callers or non-registered callers, and their devices for interaction with integration platform 109. In one embodiment, authentication may include receiving and validating a login name and/or user identification value as provided or established for a particular user during a registration process with the service provider. In one embodiment, the authentication procedure may also be performed through the automated association of database 115 with an IP address, a carrier detection signal of a user device, mobile directory number (MDN), subscriber identity module (SIM) (e.g., of a SIM card), radiofrequency identifier (RFID) tag or other identifiers. In one example embodiment, authentication module 203 may perform multiple authentications of a user based, at least in part, on historical user information. In another example embodiment, once a caller is fully authenticated the first time, authentication module 203 may automatically match the profile information, device identifiers, and/or biometric data, e.g., voice sample, to authenticate the user the second time. Authentication may be granted based, at least in part, on the confidence level of the match. It is noted that the authentication may also include a first-time registration procedure for establishing one or more profile settings.

In one embodiment, data processing module 205 may process data collected by data collection module 201 to determine context information associated with the users, device information associated with the users, payment vehicles associated with the users, or a combination thereof. By way of example, the context information may include computing environment, data environment, online activities, historical information, preference information, spending patterns, location information, or a combination thereof associated with the users. In one example embodiment, data processing module 205 may analyze the context information to determine that a user regularly purchases goods and services from an online shopping portal using payment vehicle X, and may ascertain that the call may be regarding a payment dispute pertaining to the online shopping.

In one embodiment, training module 207 may train machine learning module 209 using various inputs to enable machine learning module 209 to automatically find contextual information associated with the users from unstructured data. In another embodiment, training module 207 may train machine learning module 209 using various inputs to identify key data, e.g., descriptive data, supplemental data, etc., related to contextual information of the users. In a further embodiment, training module 207 may train machine learning module 209 using various inputs to enable machine learning module 209 to combine unstructured data with structured data to improve the accuracy of artificial intelligence models, validate data, and leverage for advisors and customer engagement. In one instance, the training module 207 may continuously provide and/or update machine learning module 209 during training using, for instance, supervised deep convolution network or equivalents. In one embodiment, training module 207 may include an artificial intelligence (AI) engine configured to use natural language processing to conduct automated conversations with the users. For example, training module 207 may automatically process responses and may determine the intentions of the callers based on the response.

In one embodiment, machine learning module 209 is data-driven and takes into account different combinations of the data. As can be appreciated by one skilled in the art, machine learning techniques can be used to predict and improve the potency of the user's data. Machine learning can ingest the user's data, draw parallels and conclusions across disparate data sets to provide refined data. The refined data can then be abstracted further by performing operations such as categorizing, coding, transforming, interpreting, summarizing, and calculating. Further, the abstracted data can be used in the future for decision-making. In one embodiment, machine learning module 209 may be provided with IVR interactions data and user profile information by the training module 207 during the training phase. Machine learning module 209 may analyze the provided data to predict the callers' intent in calling up the organization via the IVR. In another embodiment, machine learning module 209 may analyze a large corpus of IVR interactions of callers to construct a model configured to anticipate and/or predict the services the callers in the IVR are likely to require. In a further embodiment, machine learning module 209 may analyze historical records of one or more callers to determine a purpose for the call and provide a predicted service the caller is likely to require. For example, machine learning module 209 may query database 115 to determine interaction history and profile information, or a combination thereof associated with the caller to obtain a predicted intent of the caller.

In one embodiment, user interface module 211 may enable a presentation of a graphical user interface (GUI) in a UE 101 associated with a user, e.g., an agent, a caller, etc. User interface module 211 may employ various application programming interfaces (APIs) or other function calls corresponding to the applications on UE 101, thus enabling the display of graphics primitives such as icons, menus, buttons, data entry fields, etc., for generating the user interface elements. In another embodiment, user interface module 211 may cause interfacing of the guidance information with the users, e.g., an agent, a caller, etc., to include, at least in part, one or more annotations, scripts, text messages, audio messages, video messages, or a combination thereof. Still further, user interface module 211 may be configured to operate in connection with augmented reality (AR) processing techniques, wherein various applications, graphic elements, and features may interact. In one example embodiment, integration platform 109 may collaborate with user interface module 211 to generate a unified display, e.g., a single pane of glass, by abstracting the behavior of the underlying systems into one interface. In another example embodiment, user interface module 211 may comprise a variety of interfaces, for example, interfaces for data input and output devices, referred to as I/O devices, storage devices, and the like. In a further example embodiment, user interface module 211 may implement a conversational user experience "UX" that presents one or more automated interfaces to the callers and learns about the callers based on information supplied by the user to the automated interface. In one embodiment, user interface module 211 may organize, automate, and synchronize user information to provide improved assistance and a personalized user experience. Though data spans multiple sources and sub-types, user interface module 211 may present the data in a simple user interface single user experience.

The above-presented modules and components of integration platform 109 may be implemented in hardware, firmware, software, or a combination thereof. Though depicted as a separate entity in FIG. 1, it is contemplated that integration platform 109 may be implemented for direct operation by respective UE 101. As such, integration platform 109 may generate direct signal inputs by way of the operating system of the UE 101. In another embodiment, one or more of the modules 201-211 may be implemented for operation by respective UEs, as integration platform 109, or a combination thereof. The various executions presented herein contemplate any and all arrangements and models.

Figure 3:
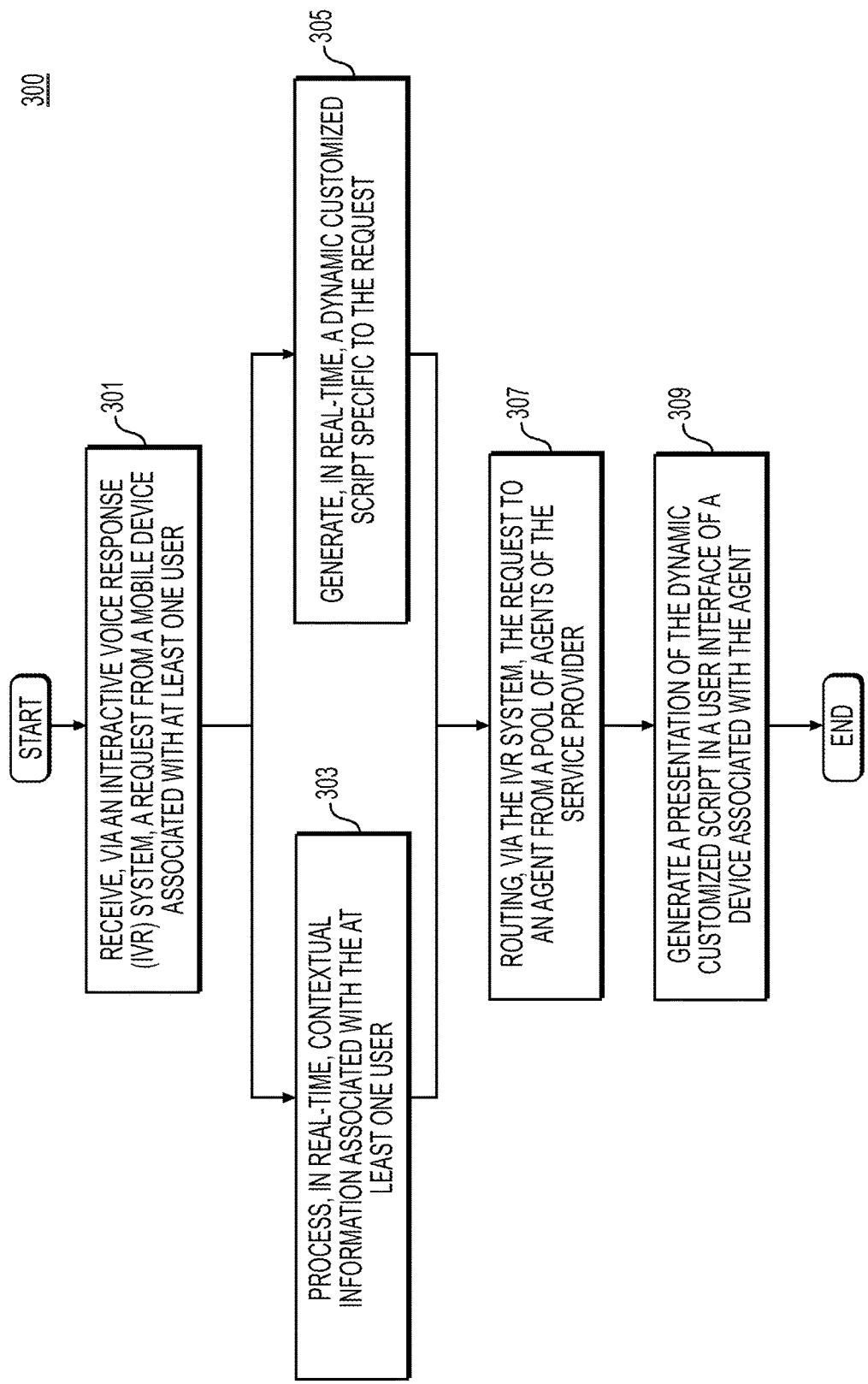
FIG. 3 is a flowchart of a process for real-time processing of contextual information of one or more callers to generate dynamic customized scripts, according to one embodiment.

FIG. 3 is a flowchart of a process for real-time processing of contextual information of one or more callers to generate dynamic customized scripts, according to one embodiment. In various embodiments, integration platform 109 and/or any of modules 201-211 may perform one or more portions of process 300 and may be implemented in, for instance, a chip set including a processor and a memory as shown in FIG. 12. As such, integration platform 109 and/or any of modules 201-211 may provide means for accomplishing various parts of process 300, as well as means for accomplishing embodiments of other processes described herein in conjunction with other components of system 100. Although process 300 is illustrated and described as a sequence of steps, it is contemplated that various embodiments of process 300 may be performed in any order or combination and need not include all of the illustrated steps.

In step 301, integration platform 109 may receive, via an interactive voice response (IVR) system, a request from a mobile device associated with at least one user. In one example embodiment, users may call, via their UE 101, service providers e.g., contact centers, with a request, e.g., issues with certain card transaction, dispute a transaction, various other transaction-related inquiries, etc. The calls may be received by IVR system 113 of the service providers. In one example embodiment, a call is placed by a caller to a contact center of a service provider, e.g., a bank. The call may be directed, through the public switched telephone network, although, calls or communications may also be received through other channels, such as the Internet, private branch exchange, intranet VOIP, etc. The source address of the call, e.g., calling telephone number, IP address, or other identifiers, is received by integration platform 109 to identify the caller.

In step 303, integration platform 109 may process, in real-time, contextual information associated with at least one user based, at least in part, on the request. In one embodiment, the contextual information includes past interactions with IVR system 113, online activity information, preference information, location information, historical activity patterns, or a combination thereof associated with at least one user. In one example embodiment, as the users are interacting with IVR system 113, the integration platform 109 may process contextual information of the users based, at least in part, on the user information received via IVR system 113. In another example embodiment, while the users are interacting with IVR system 113, the integration platform 109 may receive, in real-time, contextual information from database 115, content provider 117, services platform 119, or a combination thereof. The integration platform 109 may process the contextual information to determine the intent for the call.

In step 305, integration platform 109 may generate, in real-time, a dynamic customized script specific to the request based, at least in part, on the processing of the contextual information. In one embodiment, a dynamic customized script is a script that changes in real-time based, at least in part, on contextual information of the user, user interaction with IVR system 113, or a combination thereof. In one example embodiment, sentences in the dynamic customized script may be dynamically reordered, added, or deleted in real-time for the benefit of the users. Such sentences may be dynamically altered in the script by being dynamically reordered or created in real-time, retrieved from a repository of relevant industry and software descriptions, or in other ways as will occur to those of skill in the art. In another embodiment, integration platform 109 may generate any other type of notifications, e.g., aural, visual, etc., in a user interface of a device associated with the agents based on the contextual information of the caller.

In step 307, integration platform 109 may route, via IVR system 113, the request to an agent from a pool of agents of the service provider. In one embodiment, the agent is selected from the pool of agents based, at least in part, on the performance level of the agent, the experience of the agent, previous interaction of the agent with at least one user, language skills of the agent, or a combination thereof. In another embodiment, integration platform 109 may route a caller to an agent via a matching algorithm. In one example embodiment, the matching algorithm may match a caller to an agent based on the probability of success during the interaction. The matching algorithm may also use historical interactions of the agents with the users to find patterns for the user-agent pairs and the result of interactions. In one embodiment, integration platform 109 may implement skill-based routing algorithms for selecting at least one agent with the best match of skills to handle the problem presented.

In step 309, integration platform 109 may generate a presentation of the dynamic customized script in a user interface of a device associated with the agent. In one embodiment, the dynamic customized script is step-by-step guidance to the agent for handling the request of a user. In another embodiment, the dynamic customized script is presented as a unified display in an interface of UE 101 associated with the agent/service provider.

Figure 4:
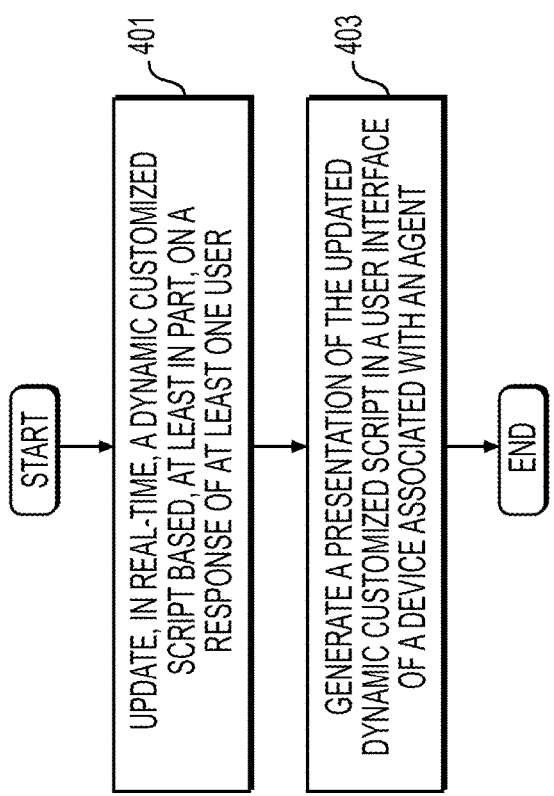
FIG. 4 is a flowchart of a process for updating the dynamic customized script, according to one embodiment.

FIG. 4 is a flowchart of a process for updating the dynamic customized script, according to one embodiment. In various embodiments, integration platform 109 and/or any of modules 201-211 may perform one or more portions of process 400 and may be implemented in, for instance, a chip set including a processor and a memory as shown in FIG. 12. As such, integration platform 109 and/or any of modules 201-211 may provide means for accomplishing various parts of process 400, as well as means for accomplishing embodiments of other processes described herein in conjunction with other components of system 100. Although process 400 is illustrated and described as a sequence of steps, it is contemplated that various embodiments of process 400 may be performed in any order or combination and need not include all of the illustrated steps.

In step 401, integration platform 109 may update, in real-time, the dynamic customized script based, at least in part, on a response of at least one user. In one embodiment, the response includes user interactions with IVR system 113, user interactions with the agents, or a combination thereof. In another embodiment, integration platform 109 may update, in real-time, the dynamic customized script based, at least in part, on contextual information of the user.

In step 403, integration platform 109 may generate a presentation of the updated dynamic customized script in the user interface of the device associated with the agent. In one embodiment, integration platform 109 may present the updated dynamic customized script in real-time.

Figure 5:
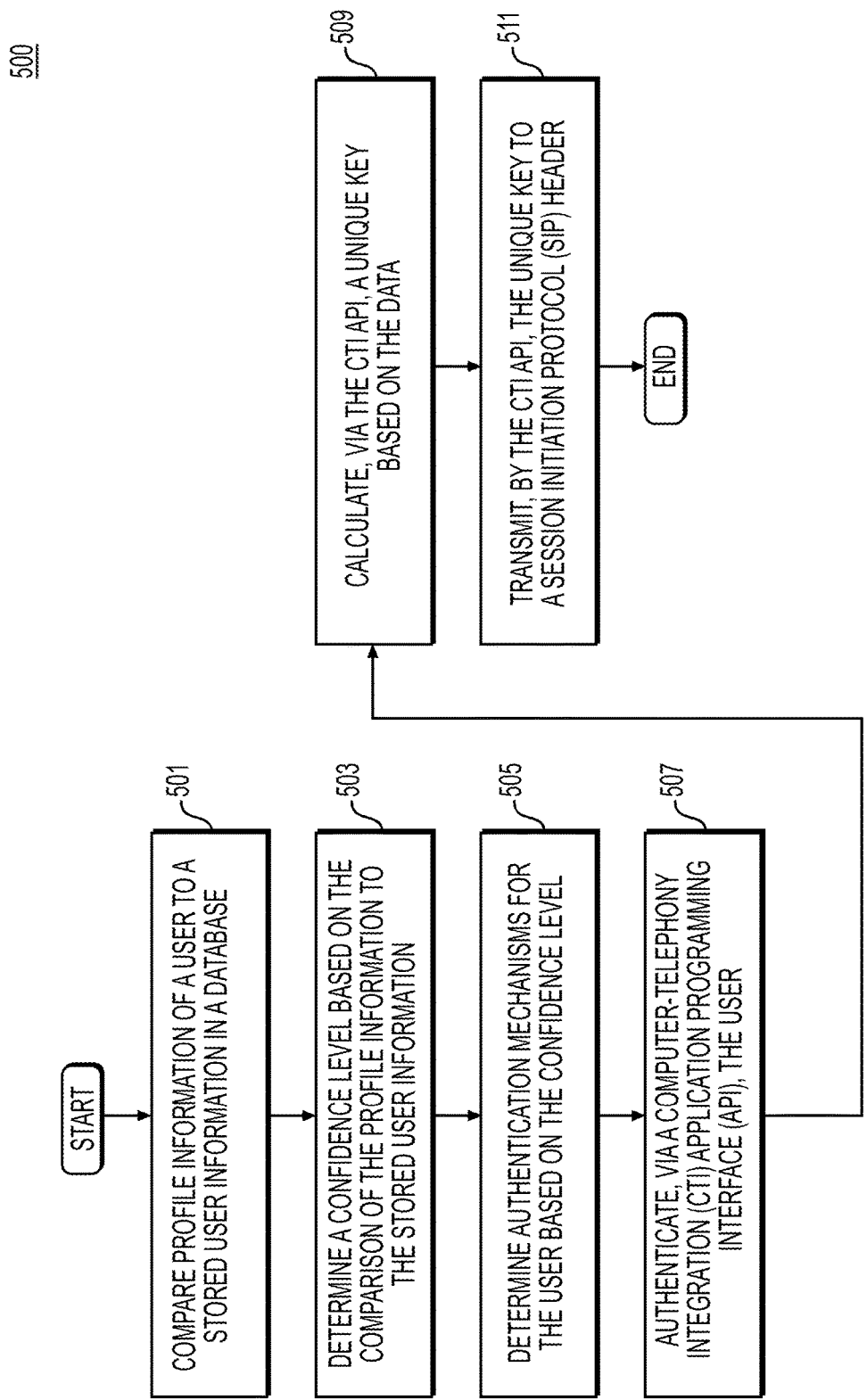
FIG. 5 is a flowchart of a process for determining authentication mechanisms for a user, according to one embodiment.

FIG. 5 is a flowchart of a process for determining authentication mechanisms for a user, according to one embodiment. In various embodiments, integration platform 109 and/or any of modules 201-211 may perform one or more portions of process 500 and may be implemented in, for instance, a chip set including a processor and a memory as shown in FIG. 12. As such, integration platform 109 and/or any of modules 201-211 may provide means for accomplishing various parts of process 500, as well as means for accomplishing embodiments of other processes described herein in conjunction with other components of system 100. Although process 500 is illustrated and described as a sequence of steps, it is contemplated that various embodiments of process 500 may be performed in any order or combination and need not include all of the illustrated steps.

In step 501, integration platform 109 may compare profile information of at least one user to at least one stored user information in a database. In one embodiment, the profile information may include name information, age information, gender information, behavior information, preference information, purchase history information, location information, device information, or a combination thereof associated with the user. In one example embodiment, integration platform 109 may compare name information and device information of the caller with the stored name information and device information in database 115 to determine a match. In another example embodiment, integration platform 109 may compare purchase history information and location information with the stored purchase history information and location information in database 115 to determine a match.

In step 503, integration platform 109 may determine a confidence level based, at least in part, on the comparison of the profile information to the stored user information. In one example embodiment, integration platform 109 may determine a high confidence level upon determining a match between the profile information to the stored user information. In another example embodiment, integration platform 109 may determine a low confidence level upon determining incompatibility between the profile information to the stored user information.

In step 505, integration platform 109 may determine one or more authentication mechanisms for at least one user based, at least in part, on the confidence level. In one embodiment, the one or more authentication mechanisms include predefined values, a preset username and password, user identification, device identification, a biometric pattern corresponding to the user, or a combination thereof. In one embodiment, the authentication level increases with a decrease in the confidence level and vice-versa. In one example embodiment, integration platform 109 may perform multiple-step authentication of the user upon determining a low confidence level. In another example embodiment, integration platform 109 may perform a simple authentication of the user, e.g., username and password verification, upon determining a high confidence level. During the identity confirmation process, the caller may be directed to provide certain details relating to the intent of the call. For example, the call may be asked to "press one for sales, two for service, three for technical support, four for returns, and five for other". Each selected choice, for example, could include a further menu, or an interactive voice response, or an option to record information.

In step 507, integration platform 109 may authenticate, via a computer-telephony integration (CTI) Application Programming Interface (API), the at least one user. In one embodiment, data pertaining to the request is transmitted to the CTI API during the authentication, wherein the data includes payload information.

In step 509, integration platform 109 may calculate, via the CTI API, a unique key based, at least in part, on the data. The CTI system 111 or another information processing device operable in cooperation with the CTI system 111 may generate a unique key. In one example embodiment, the unique key is a user session ID. In another example embodiment, the unique key is a specific customer record. In one example embodiment, the caller may have privacy concerns while sharing confidential information. Integration platform 109 may anonymize the information that is sent by the callers to authentication module 203. In one embodiment, integration platform 109 may encode the confidential information shared by the caller. For example, instead of transmitting the phone numbers, an encoding of the phone number may be transmitted. The encoding may be performed through a predetermined algorithm. Such encoding algorithms would allow for the one-way encoding of information and not allow for the encoded information to be decoded, such examples of encoding are hashes.

In step 511, integration platform 109 may transmit, via the CTI API, the unique key to a session initiation protocol (SIP) header. In one example embodiment, the unique key is transmitted to both UE 101 and the service provider. The user inputs the unique key to UE 101 for authenticating access to the service provider. The integration platform 109 compares the unique key and allows access to the service upon match. Then, the unique key which has been used for the authentication is invalidated.

Figure 6:
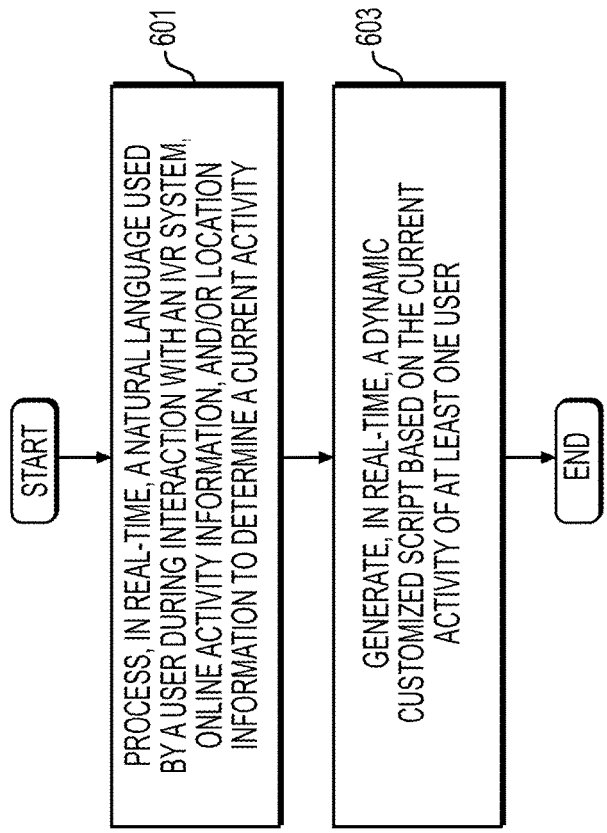
FIG. 6 is a flowchart of a process for generating a dynamic customized script based on the current activity of the user, according to one embodiment.

FIG. 6 is a flowchart of a process for generating a dynamic customized script based on the current activity of the user, according to one embodiment. In various embodiments, integration platform 109 and/or any of modules 201-211 may perform one or more portions of process 600 and may be implemented in, for instance, a chip set including a processor and a memory as shown in FIG. 12. As such, integration platform 109 and/or any of modules 201-211 may provide means for accomplishing various parts of process 600, as well as means for accomplishing embodiments of other processes described herein in conjunction with other components of system 100. Although process 600 is illustrated and described as a sequence of steps, it is contemplated that various embodiments of process 600 may be performed in any order or combination and need not include all of the illustrated steps.

In step 601, integration platform 109 may process, in real-time, a natural language used by at least one user during user interaction with the IVR system, the online activity information, the location information, or a combination thereof to determine the current activity of the at least one user. In one example embodiment, integration platform 109 may determine the user is accessing a web portal to do online shopping from his residence via sensor 105. The integration platform 109 may process the words uttered by the caller during the call to determine that the call is related to online shopping.

In step 603, integration platform 109 may generate, in real-time, the dynamic customized script based, at least in part, on the current activity of at least one user. In one embodiment, integration platform 109 may generate a dynamic script that is customized to address all the queries relating to the callers' online transition. For example, the dynamic script includes the types of questions to be asked to the caller about the online transaction, the answers to the questions that might be asked by the caller, or a combination thereof. These questions and answers may be updated in real-time based on the response of the caller.

FIG. 7 is a flowchart of a process for presenting a dynamic customized script, according to one embodiment. In various embodiments, integration platform 109 and/or any of modules 201-211 may perform one or more portions of process 700 and may be implemented in, for instance, a chip set including a processor and a memory as shown in FIG. 12. As such, integration platform 109 and/or any of modules 201-211 may provide means for accomplishing various parts of process 700, as well as means for accomplishing embodiments of other processes described herein in conjunction with other components of system 100. Although process 700 is illustrated and described as a sequence of steps, it is contemplated that various embodiments of process 700 may be performed in any order or combination and need not include all of the illustrated steps.

In step 701, integration platform 109 may generate a user interface in a device associated with the agent comprising a first area to display data related to at least one user. In one embodiment, the data includes user information, credit card information, transaction history information, account benefit information, address information, call history information, or a combination thereof.

In step 703, integration platform 109 may generate a user interface in a device associated with the agent comprising a second area adjacent to the first area to display the dynamic customized script. In one embodiment, the dynamic customized script includes a prompt generator to generate an audio notification, a visual notification, a textual notification, or a combination thereof.

FIG. 8 is a flowchart of a process for predicting the intent of a call, according to one embodiment. In various embodiments, integration platform 109 and/or any of modules 201-211 may perform one or more portions of process 800 and may be implemented in, for instance, a chip set including a processor and a memory as shown in FIG. 12. As such, integration platform 109 and/or any of modules 201-211 may provide means for accomplishing various parts of process 800, as well as means for accomplishing embodiments of other processes described herein in conjunction with other components of system 100. Although process 800 is illustrated and described as a sequence of steps, it is contemplated that various embodiments of process 800 may be performed in any order or combination and need not include all of the illustrated steps.

In step 801, integration platform 109 may generate a plurality of predictions about a reason for the request based, at least in part, on the processing of the contextual information. In one example embodiment, integration platform 109 may predict the caller is calling to dispute a transaction based on historical information of the caller. In one example embodiment, integration platform 109 may predict the caller is calling regarding an online transaction based on the current activity of the caller. In one example embodiment, integration platform 109 may predict the caller is calling to file a complaint based on the tone of the user while interacting with IVR system 113.

In step 803, integration platform 109 may compute a probability score for the plurality of predictions and may determine at least one prediction with the highest probability score from the plurality of predictions. In one embodiment, the highest probability score exceeds a probability score threshold. In one example embodiment, the integration platform 109 may compute a probability score of 72% that the caller is calling to dispute a transaction and a probability score of 80% that the caller is calling to file a complaint. The integration platform 109 may choose to determine that the caller is calling to file a complaint based on the probability score.

In step 805, integration platform 109 may input at least one prediction into the dynamic customized script. In one example embodiment, integration platform 109 may generate a dynamic script that is customized to address all the questions of the caller to resolve the issue and prevent the caller from filing a complaint.

Figure 9A:
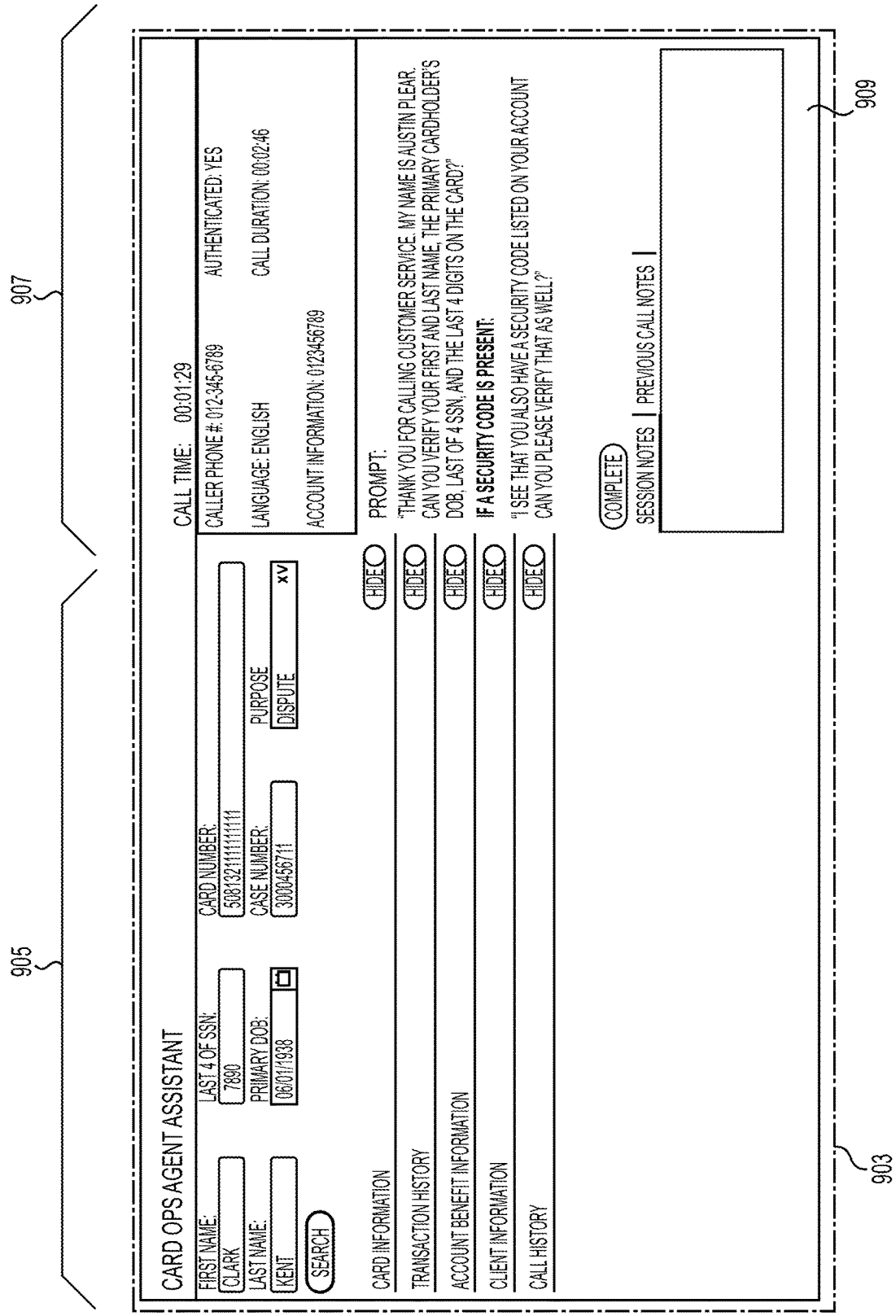

FIGS. 9A-C illustrate agent interface screens, according to various example embodiments. In one embodiment, integration platform 109 may present data from multiple sources in a unified display, i.e., a single pane of glass, by abstracting the behavior of the underlying systems into one interface. The agent sees one interface that consolidates all underlying backend systems, so they do not need to work with disparate systems or navigation constructs. This is helpful for the agents as they do not have to switch between multiple applications and have a uniform method of interaction in all scenarios. This also reduces the possibility of errors because there is a single point of entry.

In one embodiment, integration platform 109 may generate a dynamic script based on the data received, e.g., the nature of the incoming call, from the IVR. For example, a dispute will be treated differently from reporting a stolen card. In one embodiment, there is flexibility within the system for the administrators to configure, in real-time, the flow dynamically. This is important particularly in areas where there are regulatory norms that can change the flow. For example, specific businesses have service level agreements (SLA), e.g., a set of internally-determined standards to guide decisions, tied to call durations.

As depicted in FIG. 9A, agent 901 receives a dynamic customized script in user interface 903. User interface 903 comprises first area 905 to display data related to the caller. The data includes user information, credit card information, transaction history information, account benefit information, address information, call history information, or a combination thereof. User interface 903 also comprises second area 907 for presenting the dynamic customized script and additional information relating to the call. In one embodiment, the second area 907 includes a prompt generator to generate an audio notification, a visual notification, textual notification, or a combination thereof to assist the agent/service provider. It is understood that user interface 903 may be in any other format as desired.

In one embodiment, agent 901 interacts with the callers by following dynamic script 909. The dynamic script is updated based on the contextual information of the caller, the response of the caller while interacting with IVR system 113, or a combination thereof. In one embodiment, integration platform 109 may detect, in real-time, the progression of the interaction between the caller and the agent and may automatically navigate the dynamic scripts for the agent, e.g., scripts 911 and then 913 are presented in the interface as the agent finishes the last question of the script or reaches the end of the dynamic script (FIGS. 9B and 9C). In one embodiment, integration platform 109 may navigate the dynamic scripts based, at least in part, on the speed of the conversation. In one example embodiment, integration platform 109 may navigate to scripts 911 and 913 based, at least in part on, the predicted time threshold.

Figure 10:
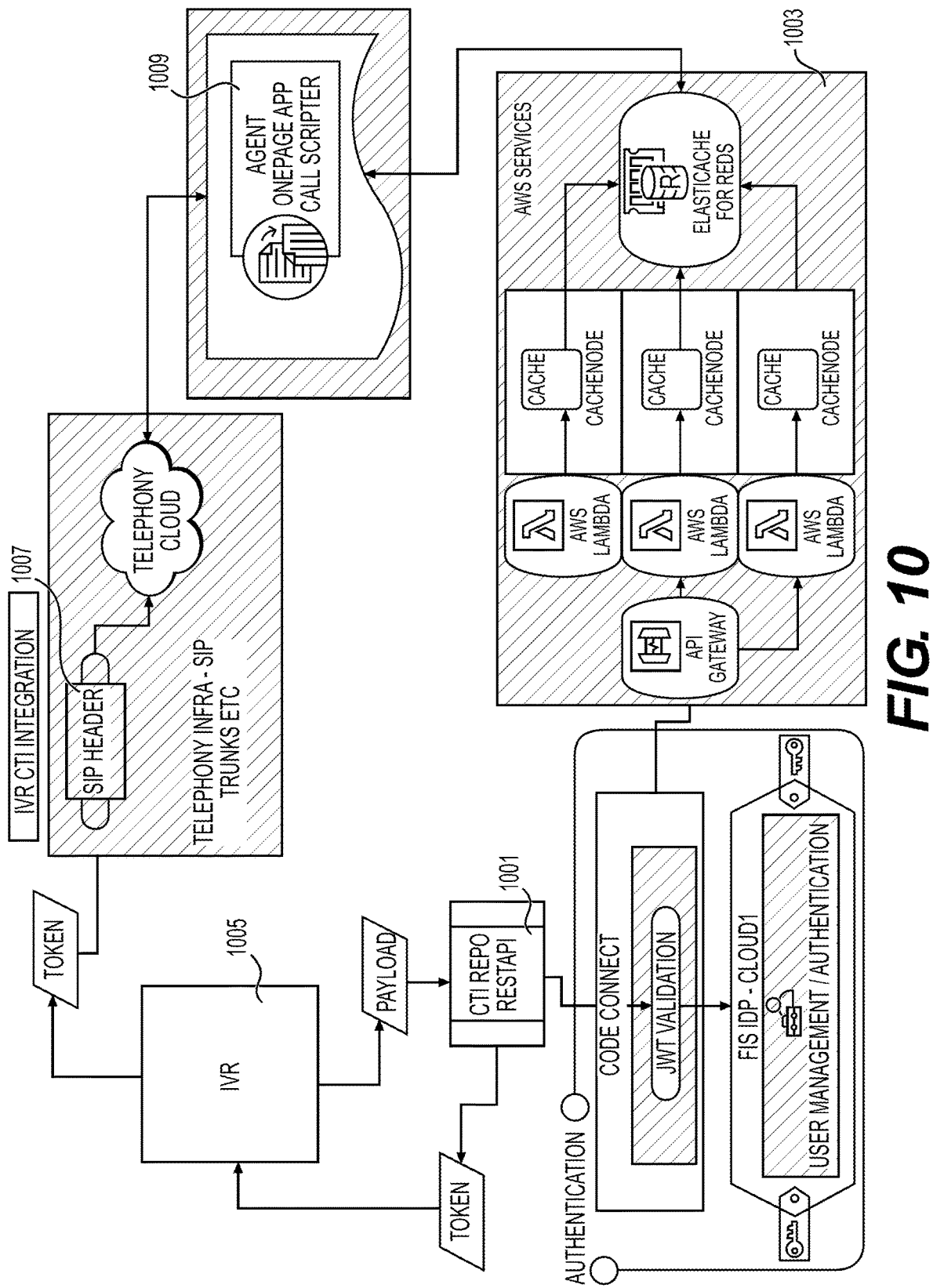
FIG. 10 is a flowchart for integration of an IVR system and a CTI system deployed within a contact center by integration platform 109, according to one example embodiment.

FIG. 10 is a flowchart for integration of CTI system 111 and IVR system 113 deployed within a contact center by integration platform 109, according to one example embodiment. In one embodiment, the IVR system may prompt callers to authenticate themselves, and also enter additional details, e.g., the purpose of the call. During this authentication, if the caller needs to speak with an agent, the caller may select the IVR option that performs the call transfer to an agent.

While the call transfer is being processed, a web service API call is made into a CTI REPO RestAPI 1001 which performs OAuth2.0 authentication. During this API call, specific details regarding the call, e.g., payload information, caller, e.g., contextual information, and purpose of the call may be passed. These data are written into an AWS Elastic Cache data store 1003, thereafter a unique key to the data is calculated, e.g., token, and returned by the CTI REPO RestAPI 1001 service to IVR 1005.

During a session initiation protocol (SIP) based call transfer of the caller to the call center, the calculated token is passed into the user-to-user (UUI) field of SIP header 1007. When the call arrives at the call center, integration platform 109 may perform a normal call distribution processing and may select an agent. As the call arrives at the agent's desktop, the call center SIP call handler delivers the token to the Agent OnePage App and Call Scripter 1009. This token is then used by Agent OnePage App and Call Scripter 1009 to retrieve information about the call from AWS Elastic Cache data store 1003. Specific details regarding the call are then presented to the agent with the caller-specific agent script.

Figure 11:
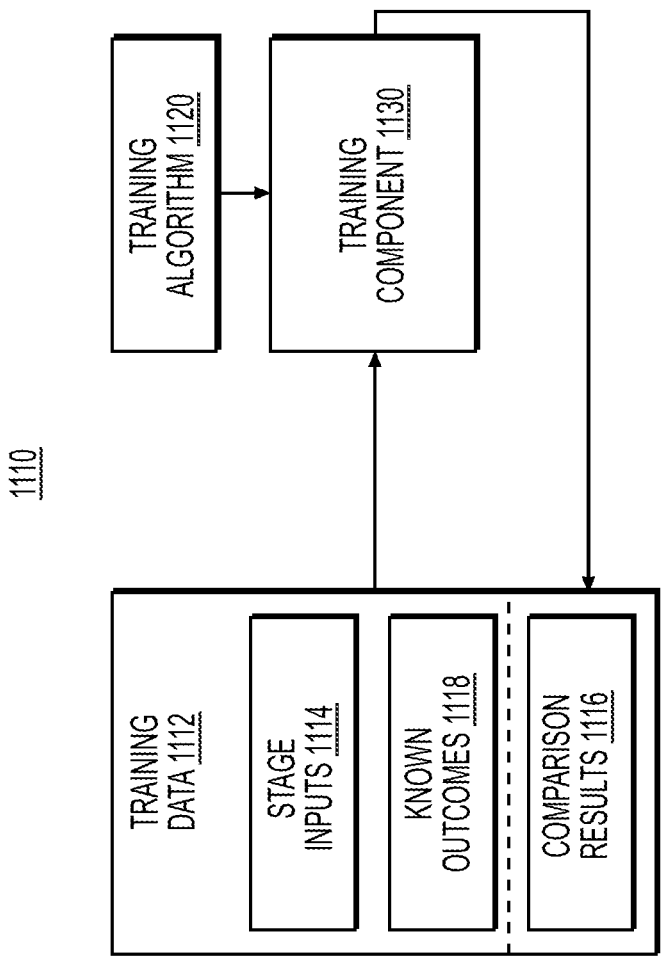
FIG. 11 shows an example machine learning training flow chart.

One or more implementations disclosed herein include and/or may be implemented using a machine learning model. For example, one or more of the speech recognition algorithms, initialization algorithm, machine-learning algorithms, matching algorithm, skill-based routing algorithms, and encoding algorithms may be implemented using a machine learning model and/or may be used to train a machine learning model. A given machine learning model may be trained using the data flow 1110 of FIG. 11. Training data 1112 may include one or more of stage inputs 1114 and known outcomes 1118 related to a machine learning model to be trained. The stage inputs 1114 may be from any applicable source including text, visual representations, data, values, comparisons, stage outputs (e.g., one or more outputs from a step from FIGS. 3, 4, 5, 6, 7, and/or 8). The known outcomes 1118 may be included for machine learning models generated based on supervised or semi-supervised training. An unsupervised machine learning model may not be trained using known outcomes 1118. Known outcomes 1118 may include known or desired outputs for future inputs similar to or in the same category as stage inputs 1114 that do not have corresponding known outputs.

The training data 1112 and a training algorithm 1120 (e.g., one or more of the speech recognition algorithms, initialization algorithm, machine-learning algorithms, matching algorithm, skill-based routing algorithms, and encoding algorithms implemented using a machine learning model and/or may be used to train a machine learning model) may be provided to a training component 1130 that may apply the training data 1112 to the training algorithm 1120 to generate a machine learning model. According to an implementation, the training component 1130 may be provided comparison results 1116 that compare a previous output of the corresponding machine learning model to apply the previous result to re-train the machine learning model. The comparison results 1116 may be used by the training component 1130 to update the corresponding machine learning model. The training algorithm 1120 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

A machine learning model used herein may be trained and/or used by adjusting one or more weights and/or one or more layers of the machine learning model. For example, during training, a given weight may be adjusted (e.g., increased, decreased, removed) based on training data or input data. Similarly, a layer may be updated, added, or removed based on training data/and or input data. The resulting outputs may be adjusted based on the adjusted weights and/or layers.

In general, any process or operation discussed in this disclosure that is understood to be computer-implementable, such as the process illustrated in FIGS. 3, 4, 5, 6, 7, and/or 8 may be performed by one or more processors of a computer system as described herein. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices. One or more processors of a computer system may be included in a single computing device or distributed among a plurality of computing devices. One or more processors of a computer system may be connected to a data storage device. A memory of the computer system may include the respective memory of each computing device of the plurality of computing devices.

In various embodiments, one or more portions of processes 300, 400, 500, 600, 700, and 800 may be implemented in, for instance, a chip set including a processor and a memory as shown in FIG. 8. FIG. 12 illustrates an implementation of a general computer system that may execute techniques presented herein. The computer system 1200 can include a set of instructions that can be executed to cause the computer system 1200 to perform any one or more of the methods, system, or computer based functions disclosed herein. The computer system 1200 may operate as a standalone device or may be connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

In a networked deployment, the computer system 1200 may operate in the capacity of a server or as a client user computer in a server-client user network environment, or as a peer computer system in a peer-to-peer (or distributed) network environment. The computer system 1200 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a personal trusted device, a web appliance, a network router, switch or bridge, or any other machine capable of executing a set of instructions (sequential or otherwise) that specify actions to be taken by that machine. In a particular implementation, the computer system 1200 can be implemented using electronic devices that provide voice, video, or data communication. Further, while a computer system 1200 is illustrated as a single system, the term "system" shall also be taken to include any collection of systems or sub-systems that individually or jointly execute a set, or multiple sets, of instructions to perform one or more computer functions.

As illustrated in FIG. 12, the computer system 1200 may include a processor 1202, e.g., a central processing unit (CPU), a graphics processing unit (GPU), or both. The processor 1202 may be a component in a variety of systems. For example, the processor 1202 may be part of a standard personal computer or a workstation. The processor 1202 may be one or more general processors, digital signal processors, application specific integrated circuits, field programmable gate arrays, servers, networks, digital circuits, analog circuits, combinations thereof, or other now known or later developed devices for analyzing and processing data. The processor 1202 may implement a software program, such as code generated manually (i.e., programmed).

The computer system 1200 may include a memory 1204 that can communicate via a bus 1208. The memory 1204 may be a main memory, a static memory, or a dynamic memory. The memory 1204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1204 includes a cache or random-access memory for the processor 1202. In alternative implementations, the memory 1204 is separate from the processor 1202, such as a cache memory of a processor, the system memory, or other memory. The memory 1204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1204 is operable to store instructions executable by the processor 1202. The functions, acts or tasks illustrated in the figures or described herein may be performed by the processor 1202 executing the instructions stored in the memory 1204. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 1200 may further include a display 1210, such as a liquid crystal display (LCD), an organic light emitting diode (OLED), a flat panel display, a solid-state display, a cathode ray tube (CRT), a projector, a printer or other now known or later developed display device for outputting determined information. The display 1210 may act as an interface for the user to see the functioning of the processor 1202, or specifically as an interface with the software stored in the memory 1204 or in the drive unit 1206.

Additionally or alternatively, the computer system 1200 may include an input/output device 1212 configured to allow a user to interact with any of the components of computer system 1200. The input/output device 1212 may be a number pad, a keyboard, or a cursor control device, such as a mouse, or a joystick, touch screen display, remote control, or any other device operative to interact with the computer system 1200.

The computer system 1200 may also or alternatively include drive unit 1206 implemented as a disk or optical drive. The drive unit 1206 may include a computer-readable medium 1222 in which one or more sets of instructions 1224, e.g. software, can be embedded. Further, instructions 1224 may embody one or more of the methods or logic as described herein. The instructions 1224 may reside completely or partially within the memory 1204 and/or within the processor 1202 during execution by the computer system 1200. The memory 1204 and the processor 1202 also may include computer-readable media as discussed above.

In some systems, a computer-readable medium 1222 includes instructions 1224 or receives and executes instructions 1224 responsive to a propagated signal so that a device connected to a network 1270 can communicate voice, video, audio, images, or any other data over the network 1270. Further, the instructions 1224 may be transmitted or received over the network 1270 via a communication port or interface 1220, and/or using a bus 1208. The communication port or interface 1220 may be a part of the processor 1202 or may be a separate component. The communication port or interface 1220 may be created in software or may be a physical connection in hardware. The communication port or interface 1220 may be configured to connect with a network 1270, external media, the display 1210, or any other components in computer system 1200, or combinations thereof. The connection with the network 1270 may be a physical connection, such as a wired Ethernet connection or may be established wirelessly as discussed below. Likewise, the additional connections with other components of the computer system 1200 may be physical connections or may be established wirelessly. The network 1270 may alternatively be directly connected to a bus 1208.

While the computer-readable medium 1222 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1222 may be non-transitory, and may be tangible.

The computer-readable medium 1222 can include a solid-state memory such as a memory card or other package that houses one or more non-volatile read-only memories. The computer-readable medium 1222 can be a random-access memory or other volatile re-writable memory. Additionally or alternatively, the computer-readable medium 1222 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1200 may be connected to a network 1270. The network 1270 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 1270 may include wide area networks (WAN), such as the Internet, local area networks (LAN), campus area networks, metropolitan area networks, a direct connection such as through a Universal Serial Bus (USB) port, or any other networks that may allow for data communication. The network 1270 may be configured to couple one computing device to another computing device to enable communication of data between the devices. The network 1270 may generally be enabled to employ any form of machine-readable media for communicating information from one device to another. The network 1270 may include communication methods by which information may travel between computing devices. The network 1270 may be divided into sub-networks. The sub-networks may allow access to all of the other components connected thereto or the sub-networks may restrict access between the components. The network 1270 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for facilitating interaction between at least one user and a service provider comprising:
    receiving, via an interactive voice response (IVR) system, a request from a mobile device associated with the at least one user;
    processing, in real-time, contextual information associated with the at least one user based, at least in part, on the request;
    authenticating, via a computer-telephony integration (CTI) Application Programming Interface (API), the at least one user, by receiving payload information data pertaining to the request by the CTI API;
    calculating, via the CTI API, a unique key based, at least in part, on the payload information data;
    generating, in real-time, a dynamic customized script specific to the request based, at least in part, on the processing of the contextual information;
    routing, via the IVR system and the CTI API, the request to an agent from a pool of agents of the service provider; and
    generating a presentation of the dynamic customized script in a user interface of a device associated with the agent, wherein the dynamic customized script is a step-by-step guidance to the agent for handling the request of the at least one user.

2. The computer-implemented method of claim 1, further comprising:
    updating, in real-time, the dynamic customized script based, at least in part, on a response of the at least one user, wherein the response includes a user interaction with the IVR system, the user interaction with the agent, or a combination thereof; and
    generating a presentation of the updated dynamic customized script in the user interface of the device associated with the agent.

3. The computer-implemented method of claim 1, further comprising:
    comparing profile information of the at least one user to at least one stored user information in a database;
    determining a confidence level based, at least in part, on the comparison of the profile information to the stored user information; and
    determining one or more authentication mechanisms for the at least one user based, at least in part, on the confidence level, wherein an authentication level increases with a decrease in the confidence level.

4. The computer-implemented method of claim 3, further comprising:
    transmitting, via the CTI API, the unique key to a session initiation protocol (SIP) header.

5. The computer-implemented method of claim 3, wherein the one or more authentication mechanisms include predefined values, a preset username and password, user identification, device identification, biometric pattern corresponding to the user, or a combination thereof.

6. The computer-implemented method of claim 1, wherein the contextual information includes past interactions with the IVR system, online activity information, preference information, location information, historical activity patterns, or a combination thereof associated with the at least one user.

7. The computer-implemented method of claim 6, further comprising:
    processing, in real-time, a natural language used by the at least one user during a user interaction with the IVR system, the online activity information, the location information, or a combination thereof to determine a current activity of the at least one user; and
    generating, in real-time, the dynamic customized script based, at least in part, on the current activity of the at least one user.

8. The computer-implemented method of claim 1, wherein the user interface of the device associated with the agent further comprising:
    a first area to display data related to the at least one user, wherein the data includes user information, credit card information, transaction history information, account benefit information, address information, call history information, or a combination thereof; and
    a second area adjacent to the first area to display the dynamic customized script, wherein the dynamic customized script includes a prompt generator to generate an audio notification, a visual notification, or a combination thereof.

9. The computer-implemented method of claim 1, further comprising:
    generating a plurality of predictions pertaining to a reason for the request based, at least in part, on the processing of the contextual information;
    computing a probability score for the plurality of predictions and determining at least one prediction with a highest probability score from the plurality of predictions, wherein the highest probability score exceeds a probability score threshold; and
    inputting the at least one prediction into the dynamic customized script.

10. The computer-implemented method of claim 1, wherein the agent is selected from the pool of agents based, at least in part, on performance level of the agent, past experience of the agent, previous interaction of the agent with the at least one user, language skills of the agent, or a combination thereof.

11. An apparatus for facilitating interaction between at least one user and a service provider comprising:

at least one processor; and at least one memory including computer program code for one or more programs, the at least one memory and the computer program code configured to, with the at least one processor, cause the apparatus to perform operations comprising:

receive, via an interactive voice response (IVR) system, a request from a mobile device associated with the at least one user;

process, in real-time, contextual information associated with the at least one user based, at least in part, on the request;

authenticate, via a computer-telephony integration (CTI) Application Programming Interface (API), the at least one user, by receiving payload information data pertaining to the request by the CTI API;

calculate, via the CTI API, a unique key based, at least in part, on the payload information data;

generate, in real-time, a dynamic customized script specific to the request based, at least in part, on the processing of the contextual information;

route, via the IVR system and the CTI API, the request to an agent from a pool of agents of the service provider; and generate a presentation of the dynamic customized script in a user interface of a device associated with the agent, wherein the dynamic customized script is a step-by-step guidance to the agent for handling the request of the at least one user.

12. The apparatus of claim 11, further comprising:

update, in real-time, the dynamic customized script based, at least in part, on a response of the at least one user, wherein the response includes a user interaction with the IVR system, the user interaction with the agent, or a combination thereof; and generate a presentation of the updated dynamic customized script in the user interface of the device associated with the agent.

13. The apparatus of claim 11, further comprising:

compare profile information of the at least one user to at least one stored user information in a database;

determine a confidence level based, at least in part, on the comparison of the profile information to the stored user information; and determine one or more authentication mechanisms for the at least one user based, at least in part, on the confidence level, wherein an authentication level increases with a decrease in the confidence level.

14. The apparatus of claim 13, further comprising:

transmit, via the CTI API, the unique key to a session initiation protocol (SIP) header.

15. The apparatus of claim 13, wherein the one or more authentication mechanisms include predefined values, a preset username and password, user identification, device identification, biometric pattern corresponding to the user, or a combination thereof.

16. The apparatus of claim 11, wherein the contextual information includes past interactions with the IVR system, online activity information, preference information, location information, historical activity patterns, or a combination thereof associated with the at least one user.

17. The apparatus of claim 16, further comprising:

processing, in real-time, a natural language used by the at least one user during a user interaction with the IVR system, the online activity information, the location information, or a combination thereof to determine a current activity of the at least one user; and generating, in real-time, the dynamic customized script based, at least in part, on the current activity of the at least one user.

18. A non-transitory computer-readable storage medium carrying one or more sequences of one or more instructions for facilitating interaction between at least one user and a service provider, when executed by one or more processors, cause an apparatus to at least perform the following steps:

receiving, via an interactive voice response (IVR) system, a request from a mobile device associated with the at least one user;

processing, in real-time, contextual information associated with the at least one user based, at least in part, on the request;

authenticating, via a computer-telephony integration (CTI) Application Programming Interface (API), the at least one user, by receiving payload information data pertaining to the request by the CTI API;

calculating, via the CTI API, a unique key based, at least in part, on the payload information data;

generating, in real-time, a dynamic customized script specific to the request based, at least in part, on the processing of the contextual information;

routing, via the IVR system and the CTI API, the request to an agent from a pool of agents of the service provider; and generating a presentation of the dynamic customized script in a user interface of a device associated with the agent, wherein the dynamic customized script is a step-by-step guidance to the agent for handling the request of the at least one user.

19. The non-transitory computer-readable storage medium of claim 18, further comprising:

updating, in real-time, the dynamic customized script based, at least in part, on a response of the at least one user, wherein the response includes a user interaction with the IVR system, the user interaction with the agent, or a combination thereof; and generating a presentation of the updated dynamic customized script in the user interface of the device associated with the agent.

20. The non-transitory computer-readable storage medium of claim 18, further comprising:

comparing profile information of the at least one user to at least one stored user information in a database;

determining a confidence level based, at least in part, on the comparison of the profile information to the stored user information; and determining one or more authentication mechanisms for the at least one user based, at least in part, on the confidence level, wherein an authentication level increases with a decrease in the confidence level.

* * * * *